(12) United States Patent
Jin

(10) Patent No.: US 6,465,132 B1
(45) Date of Patent: Oct. 15, 2002

(54) ARTICLE COMPRISING SMALL DIAMETER NANOWIRES AND METHOD FOR MAKING THE SAME

(75) Inventor: Sungho Jin, Millington, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/483,297

(22) Filed: Jan. 14, 2000

Related U.S. Application Data

(60) Provisional application No. 60/145,127, filed on Jul. 22, 1999.
(51) Int. Cl.⁷ .............................. H01M 4/58; H01J 1/30
(52) U.S. Cl. ..................... 429/231.8; 313/311; 313/495
(58) Field of Search .............................. 424/210, 231.8, 424/220–224

(56) References Cited

U.S. PATENT DOCUMENTS

| | | | |
|---|---|---|---|
| 5,872,422 A | | 2/1999 | Xu et al. |
| 6,231,744 B1 | * | 5/2001 | Ying ........................... 205/324 |
| 6,248,674 B1 | * | 6/2001 | Kamins ....................... 438/798 |

OTHER PUBLICATIONS

Fan et al., "Self–Oriented Regular Arrays of Carbon Nanotubes and Their Field Emission Properties", Jan. 22, 1999, vol. 283 Science, pp. 512–514.
Kong et al., "Synthesis of Individual Single–Walled Carbon Nanotubes on Patterned Silicon Wafers", vol. 395, Oct. 29, 1998, pp. 878–881.
Li et al., "Large Scale Synthesis of Aligned Carbon Nanotubes", vol. 274, Dec. 6, 1996, pp. 1701–1703.
Ren et al., "Synthesis of Large Arrays of Well–Aligned Carbon Nanotubes on Glass", vol. 282, Nov. 6, 1998, Science, pp. 1105–1107.

* cited by examiner

*Primary Examiner*—Patrick Ryan
*Assistant Examiner*—Mark Ruthkosky
(74) *Attorney, Agent, or Firm*—Lowenstein Sandler PC

(57) ABSTRACT

A nanowire structure that may be used to fabricate small diameter and aligned nanowires, e.g., having a diameter of less than 50 nm and more preferably, less than 10 nm, is disclosed. The structure includes an alloy substrate having at least a first phase and a second phase, wherein the first phase is catalytic and the second phase is less catalytic (weakly or non-catalytic). A plurality of small diameter nanowires are grown from the first phase of the alloy substrate. Each one of the plurality of nanowires is substantially vertically aligned relative to the substrate and preferably, the average deviation from full vertical alignment is less than 25 degrees, and more preferably less than 15 degrees. The alloy substrate is fabricated with an alloy system of catalytic and non (or less) catalytic elements that are phase separated, e.g., by spinodal decomposition or nucleation-and-growth type transformation. Also disclosed is a method for making small diameter nanowires comprising providing the phase-separated substrate including catalytic regions, elongating the substrate to reduce the diameters of the catalytic regions, and then growing the plurality of nanowires from the reduced-diameter catalytic regions. The small diameter nanowires may be used for many applications, including microwave amplifier devices, field emission display devices, and lithium-rechargeable batteries.

17 Claims, 7 Drawing Sheets

ARTICLE COMPRISING SMALL DIAMETER NANOWIRES AND METHOD FOR MAKING THE SAME

RELATED APPLICATIONS

This application claim the benefit of the filing date of U.S. provisional patent application Serial No. 60/145,127, filed Jul. 22, 1999, pursuant to 35 USC §119. This application is related to U.S. patent application Ser. No. 09/405,641, titled "Tactile Sensor Comprising Nanowires and Method for Making the Same," filed Sep. 24, 1999, by inventor Jin herein; U.S. patent application Ser. No. 09/426,457, titled "In-Situ Nano-Interconnected Circuit Devices and Method for Making the Same," filed Oct. 25, 1999, by inventors Brown, Jin and Zhu; and U.S. patent application Ser. No. 09/426,453, titled "Article Comprising Vertically Nano-Interconnected Circuit Devices And Method For Making The Same," filed Oct. 25, 1999 by inventors Brown, Jin and Zhu, all of which are assigned to the present assignee and incorporated herein by reference.

FIELD OF THE INVENTION

This invention relates to nanowires fabricated with a reduced diameter and aligned configuration and to methods of making same.

BACKGROUND OF THE INVENTION

Nano-scale wires, such as small-sized carbon nanotubes on the order of 1–100 nanometers in diameter and 0.1–100 μm in length, have received considerable attention in recent years. See Liu et al., *Science,* Vol. 280, p. 1253 (1998); Ren et al., *Science,* Vol. 282, p. 1105 (1998); Li et al., *Science,* Vol. 274, p. 1701 (1996); Frank et al ., *Science*, Vol. 280, p. 1744 (1998); J. Tans et al., *Nature,* Vol. 36, p. 474 (1997); Fan et al., *Science,* Vol. 283, p. 512 (1999); Collins et al, Science, Vol. 278, p. 100 (1997); Kong et al., *Nature,* Vol. 395, p. 878 (1998); and Ebbesen et al., *Nature,* Vol. 382, p. 54 (1996).

Carbon nanotubes exhibit unique atomic arrangements, nano-scale structures, and interesting physical properties such as one-dimensional electrical behavior, quantum conductance, and ballistic transport characteristics. The ballistic transport in carbon nanotubes, as reported by Frank et al, allows the passage of huge electrical currents in electronic circuits, with the magnitude of current density comparable to or better than those in some superconductors. Carbon nanotubes are one of the smallest dimensioned nanowire materials with generally high aspect ratio and small diameter, e.g., single-wall nanotubes may be made with diameters of ~1 nm and multi-wall nanotubes with diameters of less than ~50 nm {see Rinzler et al, *Applied Physics,* Vol. A67, p. 29 (1998); Kiang et at, *J. Physical Chem.,* Vol. 98, p. 6612 (1994), and Kiang et al, *Physical Review Letters,* Vol. 81, p. 1869 (1998)}, although the single-walled nanotubes are generally prepared as bundles to result in an overall increased diameter, as described below.

High-quality single-walled carbon nanotubes are typically grown as randomly oriented, needle-like or spaghetti-like, tangled nanowires by laser ablation or arc techniques (a chemical purification process is usually needed for arc-generated carbon nanotubes to remove non-nanotube materials such as graphitic or amorphous phase, catalyst metals, etc). Chemical vapor deposition (CVD) methods such as used by Ren et al., Fan et al., and Li et al tend to produce multiwall nanowires attached to a substrate, often with a semi-aligned or an aligned, parallel growth perpendicular to the substrate. As described in these articles, catalytic decomposition of hydrocarbon-containing precursors such as ethylene, methane, or benzene produces carbon nanotubes when the reaction parameters such as temperature, time, precursor concentration, flow rate, are optimized. Nucleation layers such as thin coatings of Ni, Co, Fe, etc. are often intentionally added to the substrate surface to nucleate a multiplicity of isolated nanowires. Carbon nanotubes can also be nucleated and grown on a substrate without using such a metal nucleating layer, e.g., by using a hydrocarbon-containing precursor mixed with a chemical component {such as ferrocene, $(C_5H_5)_2Fe$} which contains one or more of these catalytic metal atoms. During the chemical vapor decomposition, these metal atoms serve to nucleate the nanotubes on the substrate surface. See Cheng et al., *Chem. Physics Letters,* Vol. 289, p. 602 (1998), and Andrews et al., *Chem. Physics Letters,* Vol. 303, p. 467 (1999).

The modem trend in electronic circuit design, interconnection, and packaging is toward use of finer features, such that submicron feature sizes have been reached in recent years. In producing ultra-high density electronic packaging, a small width of the circuit lines is important, as well as a three-dimensional, multi-layer configuration with vertically-integrated circuit layers. The small dimensions of electrically-conducting nanowires such as carbon nanotubes make them useful as nano-scale, vertically-connecting wires between circuit device layers as well as in-plane connecting wires between adjacent electrical pads.

The diameter of the nanowires can affect the bandgap of semiconducting carbon nanotubes with accompanying changes in electrical conductivity. See Martel et al, APP. *Physics Letters,* Vol. 73, p. 2447 (1998). Control of the nanowire diameter and orientation is important for many device applications. In addition to nano-scale circuit interconnections, carbon nanotubes are useful for field emission devices such as flat panel field emission displays and microwave amplifiers. Conventional field emission cathode materials typically have been made of metal (such as Mo) or semiconductor material (such as Si) with sharp tips of submicron size. However, with these materials the control voltage required for emission is relatively high (around 100 V), because of high work functions and insufficiently sharp tips. To significantly enhance local fields and result in an overall reduced voltage requirement for operating field emission devices, it would be advantageous to provide new cathode materials (e.g., comprising carbon nanotubes) with small diameters and sharp tips.

Various previous synthesis techniques produce nanowires having uncontrolled and often vastly varying diameters. At present, there is no well-established technique for obtaining a selected and desired nanowire diameter. Single-wall nanotubes (SWNTs) are typically prepared as bundles consisting of many tens of nanotubes stuck together by Van der Waals force with each bundle having an overall, large diameter (e.g., of about 20–100 nm), although each individual SWNT may have a small diameter of about 1 nm. Multi-wall nanotubes (MWNTs) typically have much larger diameters (e.g. of about 10–100 nm). However, for use in making nano-interconnections and field emission devices, desirably the nanowires would i) have a small overall diameter, e.g., on the order of a few nanometers, ii) be capable of existing separately without Van der Waals bundling, and iii) be capable of a parallel alignment along a certain desired direction instead of having the commonly observed, tangled spaghetti-like configuration.

In utilizing the carbon nanowires for circuit nano-interconnections, unaligned or tangled nanowires can create a risk of sideway shorting between adjacent contact pads or devices. In field emission devices, unaligned, random distribution of nanowires can cause inefficient electron emissions. In such devices, unaligned nanowires create inefficiencies, i.e., in the diode field emitter configuration, due to the varying distance and hence varying local electric fields between the cathode (comprised of emitting nanowire tips) and the anode, and in the triode configuration, due to varying distances between the cathode (nanowire tips) and the gate. In addition, when unaligned nanowires are used for emitters in a field emission device, an applied electric field between anode and cathode tends to bend the nanowires toward the field direction, the degree of which is dependent on the applied voltage. This bending causes uncontrollable and undesirable changes in the distance between cathode and gate, and hence alters the local field on different nanowires. In some cases, the bending causes outright electrical shorting between the nanowire tips and the gate. Nanowires pre-aligned in the direction toward the anode could prevent or at least reduce the likelihood of such a bending problem.

Nanowire alignment can be achieved by a number of different approaches, e.g., by using electric fields or by crowding with dense, closely-spaced nanowires, as described in the related applications, U.S. Ser. Nos. 09/405,641, 09/426,457, and 09/426,453, incorporated herein. In previous approaches, e.g., those used by Li et al., Kong et al., and Fan et al., there is no clear control of nanowire diameter, orientation, or periodicity. The diameter of the CVD synthesized carbon nanotubes may be limited by the size of the catalytic metal particles, and previously-used nanotube-nucleating catalytic particles are relatively large, e.g., on the order of 10–50 nm.

As may be appreciated from the foregoing, it would be advantageous to provide a method of controlling the diameter of nanowires and reducing the diameter to a select size. It would be particularly advantageous to provide a method for the synthesis. of small diameter nanowires, e.g., those having a diameter of about 10 nm or smaller. It also would be advantageous to provide nanowires that are aligned in parallel and untangled to allow for, among other things, nano-interconnection in an orderly manner without sideway shorting between adjacent contact pads or devices. This invention discloses nanowire structures and methods for fabricating small diameter nanowires that provide these advantages. Further advantageous may appear more fully upon considering the detailed description given below.

SUMMARY OF THE INVENTION

The invention embraces a nanowire structure that may be used to fabricate small diameter and aligned nanowires, e.g., having a diameter of less than 50 nm and more preferably, less than 10 nm. The structure includes an alloy substrate that is at least two-phased; it is comprised of at least a first phase and a second phase, wherein the first phase is catalytic and the second phase is less catalytic than the first phase (weakly or non-catalytic). A plurality of small diameter nanowires are grown from the first phase of the alloy substrate. Each one of the plurality of nanowires can be substantially vertically aligned relative to the substrate and preferably, the average deviation from full vertical alignment is less than 25 degrees, and more preferably less than 15 degrees. The alloy substrate is fabricated with an alloy system of catalytic and non (or less) catalytic elements that are phase separated, e.g., they may be spinodally decomposed or subjected to nucleation-and-growth transformation to achieve the phase-separated substrate comprising the first and second phases.

The invention further comprises a method for making small diameter nanowires comprising providing the phase-separated substrate including catalytic regions, elongating the substrate to reduce the diameters of the catalytic regions, optionally performing a subtractive or additive process to the substrate to define recessed pores therein whereby the reduced-diameter catalytic regions are disposed within the cavities of the recessed pores, and growing a plurality of nanowires from the reduced-diameter catalytic regions. The elongated substrate may be sectioned into alloy pieces before the nanowires are grown therefrom to define pieces having substantially equally-sized catalytic regions. The small diameter nanowires aligned on the substrate may be used for many applications, including microwave amplifier devices, field emission display devices, and lithium-rechargeable batteries.

BRIEF DESCRIPTION OF THE DRAWINGS

For a better understanding of the invention, an exemplary embodiment is described below, considered together with the accompanying drawings, in which:

FIGS. 4A and 4B schematically represent aligned configurations of nanowires grown from a two-phased alloy structure having recessed pores wherein FIG. 4A shows the nanowires grown perpendicular to the surface of the alloy structure and FIG. 4B shows the nanowires grown along an angled orientation;

FIGS. 5A and 5B are schematic illustrations of a microwave amplifier device comprising small diameter nanowires wherein FIG. 5B shows additional particulars of the electron gun used in the amplifier device of FIG. 5A.

It is to be understood that these drawings are for the purposes of illustrating the concepts of the invention and are not to scale. Like reference numerals are used in the figures to refer to like features.

DETAILED DESCRIPTION OF THE INVENTION

Figure 1A:
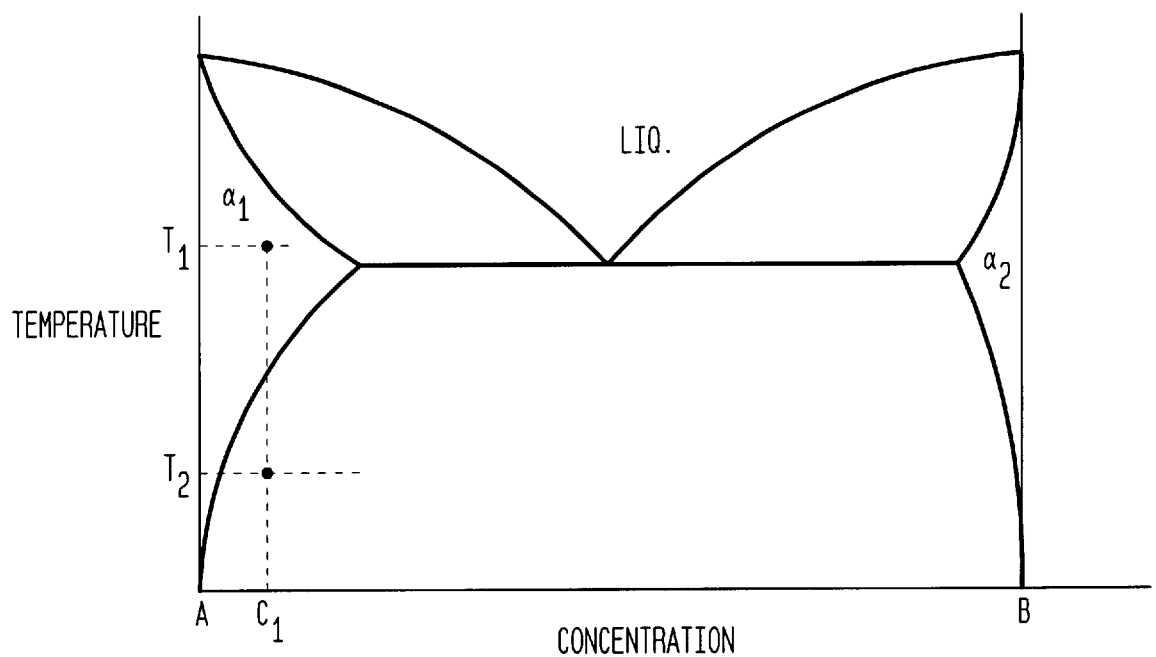
FIGS. 1A and 1B are schematic phase diagrams for alloy systems useful for creating small diameter nanowires according to the invention.

Applicants have discovered an alloy structure and method for producing nanowires that allow for the formation of nanowires that have small diameters and are vertically aligned. With this invention, "small diameter" nanowires, e.g., those having a diameter, on average, of less than 50 nm, and more preferably, of less than 10 nm, may be fabricated. (By "small diameter" herein it is meant that the nanowires individually each have a diameter on the order of about 50 nm or less). With this invention, an average particle size on the order of 1 nm may be achieved in synthesizing small diameter nanowires such as carbon SWNTs, while an average particle size on the order of about 2–20 nm may be achieved in synthesizing MWNTs. Previous methods have not allowed for fabrication of separately-disposed and aligned nanowires with such small diameters. As discussed above, previous small-diameter nanowires have been prepared as bundles to result in an overall larger (>50 nm) diameter.

The alloy structure useful for fabricating the nanowires comprises at least a two-phased alloy substrate, wherein a first phase is catalytic and a second phase is less (weakly) or non-catalytic, and the second phase supports and surrounds the first phase. In the structure, nanowires are grown from, and attached to, the catalytic phase of the substrate. The alloy elements are selected to form the alloy structure, and the alloy structure is subjected to a phase-separation process (e.g., high temperature heat treatment) such that individual catalyst phase regions of the substrate have reduced diameters (e.g. of 50 nm in diameter and less) and small diameter nanowires may be grown from the catalytic-phase regions of the substrate.

Methods for fabricating nanowires may comprise laser ablation, arc discharge, or chemical vapor deposition of a precursor gas or mixture of precursor gases. Nanowires may be nucleated and grown upward from the substrate by catalytic decomposition of a gas phase. A catalytic film may be deposited on the substrate and fine-scale, local nucleation of this film may be initiated with catalytic decomposition in a gas phase. For example, a glass circuit substrate may be provided; a catalytic film comprising a transition metal such as Ni, Co, or Fe may be deposited on the glass substrate; and then carbon nanotubes may be fabricated by decomposing $C_2H_4$ on the film surface. In the absence of alignment processing, the nanowires tend to grow as randomly-oriented or tangled nanowires. However, randomly-oriented or tangled nanowires are not suitable for various applications, such as in making vertical interconnections, as they can cause sideway electrical shorting between adjacent contact pads. For other applications such as field emission devices, tilted nanowires tend to bend or stand up along the field direction which can cause electrical shorting or changes in local fields near the electron emitting tips.

This invention provides an advantageous method for growing nanowires in a substantially aligned and parallel fashion. The method includes providing the two-phased or multi-phased alloy substrate (having a catalytic phase and at least one less (or non) catalytic phase), and creating a recessed pore surface on the substrate, wherein the catalytic phase is disposed within cavities of the recessed pores. Nanowires are then nucleated out of the cavities, e.g., from the catalytic phase materials. Preferably, the deviation from complete vertical alignment is insubstantial, that is, it is less than about 25 degrees and preferably less than 15 degrees from full (90°) alignment. The alloy structure, i.e., having the two-phased alloy substrate and aligned, small diameter nanowires extending therefrom, may be used in many applications including microwave amplifier and field emission display devices.

To synthesize small diameter carbon nanowires by CVD processing, the catalyst particles should be small, as the size of the catalyst particles will impact upon the final diameter of the nanowires. This invention uses fine-scale alloy systems comprising catalytic and non- or less-catalytic elements to achieve the small diameter nanowires. In the alloy substrate formed with these alloy systems, the catalytic phase is preferably supported and surrounded by the non-catalytic or less-catalytic phase. The alloy systems may be two-phased decomposed systems, or they may be multi-phased. Preferred alloy systems contain at least one of the known catalytic metals for CVD growth of nanowires such as Fe, Ni, or Co, but other catalytic metals may be used as well. Preferred alloy systems are those that can be solid solution annealed at high temperatures, e.g., at about 500° C. to 1200° C., and then solid-state transformed into a two- or multi-phased structure, e.g., by heat treatment at a lower temperature (e.g., at about 400° C. to 900° C.). Processes for forming fine catalytic structures with these alloy systems include nucleation-and-growth (N&G) type transformation and spinodal decomposition.

Figure 1B:
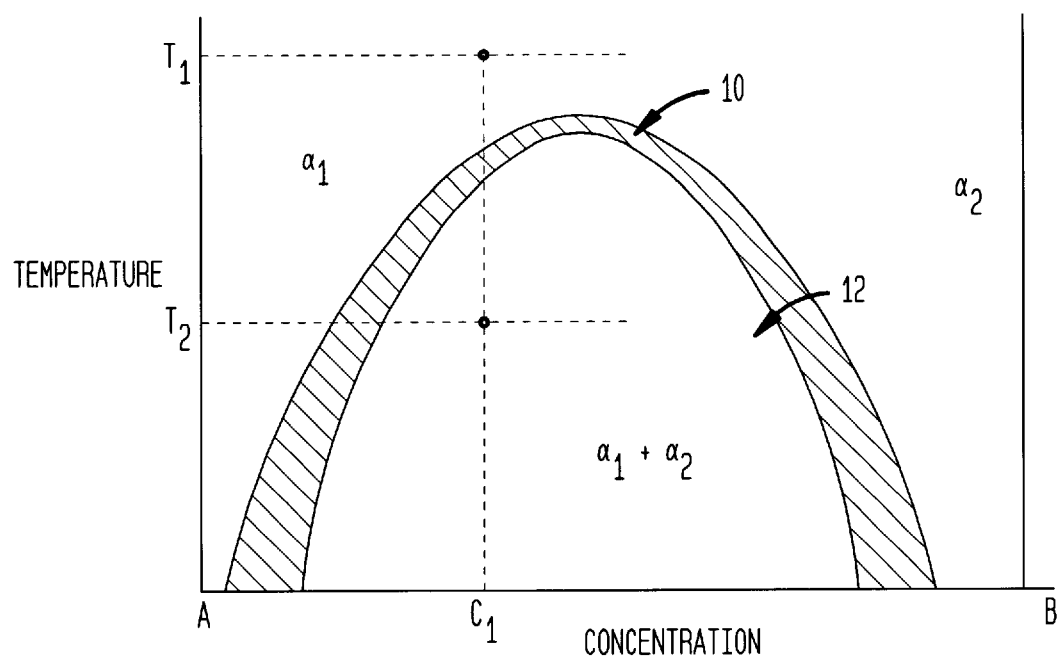

To illustrate, FIGS. 1A and 1B are schematic phase diagrams showing plots of concentrations of alloy elements as a function of temperature. As can be seen, single-phase conditions of alloy elements ($\alpha_1$, $\alpha_2$) may be transformed to two-phase conditions ($\alpha_1+\alpha_2$) with appropriate heat treatments. FIG. 1A reflects a N&G type transformation to a two-phased structure, and FIG. 1B a spinodal decomposition. In FIG. 1A, a single-phased alloy system is heat treated in the high temperature single-phase (a,) region, e.g., at $T_1$. The system is then cooled to and maintained at a lower temperature in the two-phase ($\alpha_1+\alpha_2$) region, e.g., at $T_2$, which produces fine precipitates. For example, if the original alloy system comprises an alloy system of Cu—Co containing less than about 8 weight % Co, the system may be heat treated at a temperature above 650° C., more preferably at above 800° C., and then treated at a lower temperature of about 400 to 600° C., to produce a precipitate of Co-rich particles in a Cu-rich matrix. Similar processing conditions may be applied to the Cu-rich Cu—Fe alloy system.

FIG. 1B reflects a spinodal decomposition to achieve a phase separation within a miscibility gap at region 12, and an N&G type-transformation in two-phased region 10. As reflected in FIG. 1B, with changes in temperature, the growth of compositional modulation from the single phase to the two-phased region ($\alpha_1+\alpha_2$) may occur gradually from an initially homogeneous solution. At the early stage of spinodal decomposition, there is a periodic and sinusoidal compositional fluctuation. The particle size of the decomposed phase may be described in terms of "wavelength," and the compositional difference between the two phases ($a_1$, and $a_2$) described in terms of "amplitude." See, e.g., Cahn, Acta Met, vol. 10, p. 179 (1962). With the spinodal transformation (e.g., at 12), any small or large compositional fluctuation lowers the free energy of the alloy system. Thus, spinodal transformation occurs spontaneously without having to overcome a nucleation barrier, and the resultant wavelength (or particle size) is generally smaller and more uniform than in the N&G transformation. This uniformity and small particle size is beneficial for nucleating uniform, small-diameter carbon nanotubes during the CVD process and in achieving uniform electrical properties. Thus, spinodal decomposition is preferred to N&G, although both methods are contemplated with the invention.

The particle size obtained from N&G or spinodal decomposition may be small, e.g., less than ~10 nm in diameter, with appropriate selection of the alloy system and heat treatment used to induce the phase separation. The alloy systems used to achieve the two- or multi-phased structures may include (i) catalytic or "nucleating" elements; (ii) non-catalytic or less-catalytic elements; and (iii) other optional alloying elements. For use with N&G, suitable catalytic elements include Fe, Co and Ni, and suitable non-catalytic elements include Cu and Cr. In these alloy systems, the catalytic element should exhibit decreasing solubility with decreasing temperature to enable the precipitation-type phase segregation. The other alloying elements optionally added to these systems may comprise Al, Si, Ti, V, Mn, Zn, Zr, Mo, Hf, Ta, W, Ag, Au, In, Sn, Sb, Bi and Pb. The other optional alloying elements preferably comprise less than 30% by weight of the alloy system, with each particular element advantageously comprising less than 5% by weight. To ensure a sufficient geometric separation of the nanowire-nucleating particles, preferably the alloy system contains less than about 40% by weight of the catalytic element, and more preferably less than 20% by weight of the catalytic element.

Alloy systems suitable for use with spinodal decomposition include Fe—Cr systems with a composition in the spinodal range (e.g., ~35–65 weight % Cr), Fe—Cr—Co (20–65% Cr, 1–30% Co, and balance Fe), Cu—Ni—Fe (~15–40% Ni, 15–30% Fe, and balance Cu), and Cu—Ni—Co (~20–40% Ni, 20–40% Co, and balance Cu). As with the N&G alloy systems, these alloy systems may optionally contain other alloying elements, preferably at less than 30% by weight with each element present at less than 5% by weight. The N&G-type and spinodal-type phase-separated alloy structures may comprise catalytic elements having an average particle size of less than 50 nm, preferably less than 10 nm, and even more preferably less than 6 nm. Alternatively and advantageously, an additional processing approach may be applied to further reduce the catalyst diameter and also impart an aligned configuration to the nanowires.

Figure 2A:
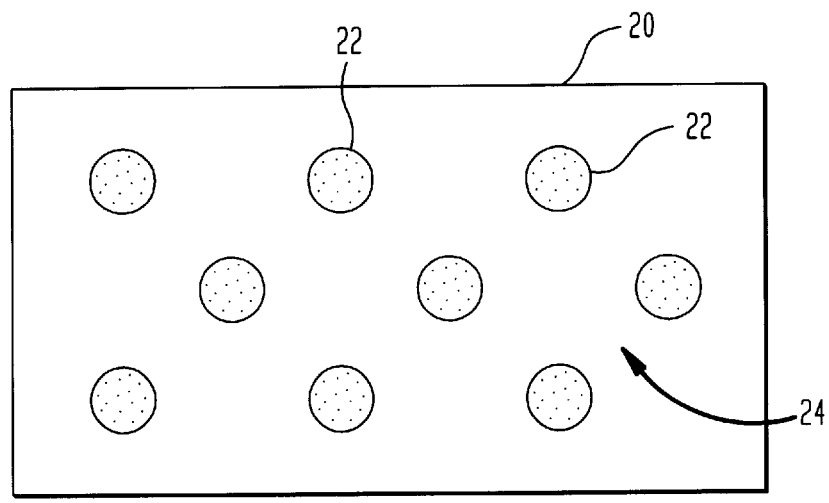
FIGS. 2A–2F are schematic illustrations of two-phased alloy structures illustrating processing steps of forming aligned and small-diameter nanowires.
Figure 2B:
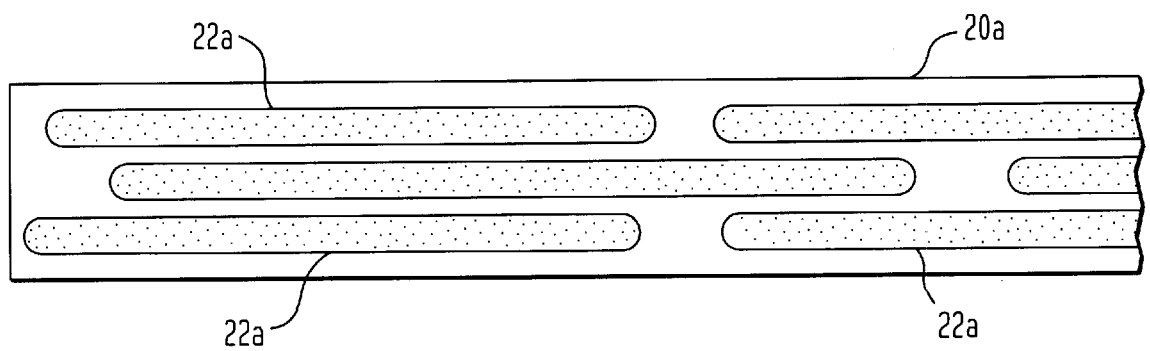
Figure 2C:
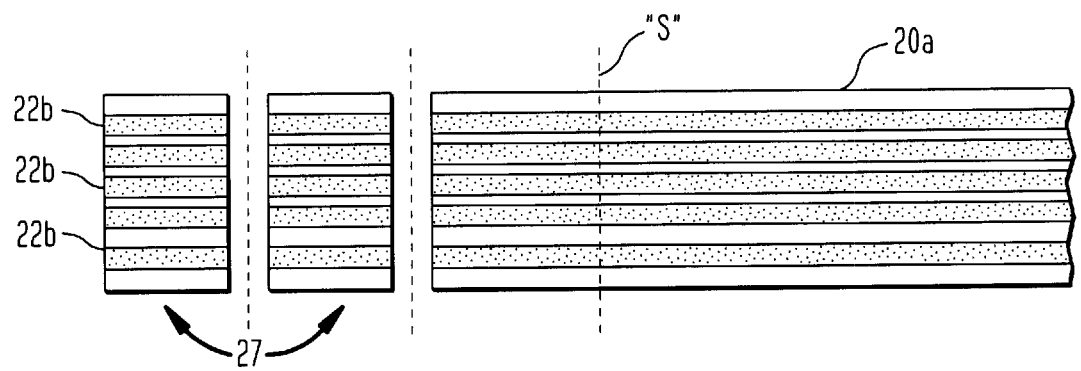

In one embodiment, a fine-scale structure may be mechanically sectioned or surface-ground to reveal a cross-section of a reduced diameter catalyst phase so that carbon nanotubes having a comparable diameter can be nucleated from the cross-section. FIGS. 2A–2C schematically show exemplary alloy substrates illustrating the inventive process of obtaining aligned and reduced-diameter carbon nanotubes. FIG. 2A represents a phase-separated substrate or two-phase alloy rod substrate 20 comprising a plurality of catalytic-phase rods 22 (e.g., rich in Fe, Co, or Ni), surrounded and supported by a non- (or less-) catalytic phase material 24. The alloys used to fabricate this two-phased substrate may comprise the N&G or spinodal alloys inside a miscibility gap, as previously described, which are heat treated for phase separation. The desired average particle size of the catalytic phase at this initial stage of processing (i.e., using the two-phased alloy substrate of FIG. 2A) is typically in the range of 2–200 nm, and preferably in the range of 2–50 nm.

Figure 3:
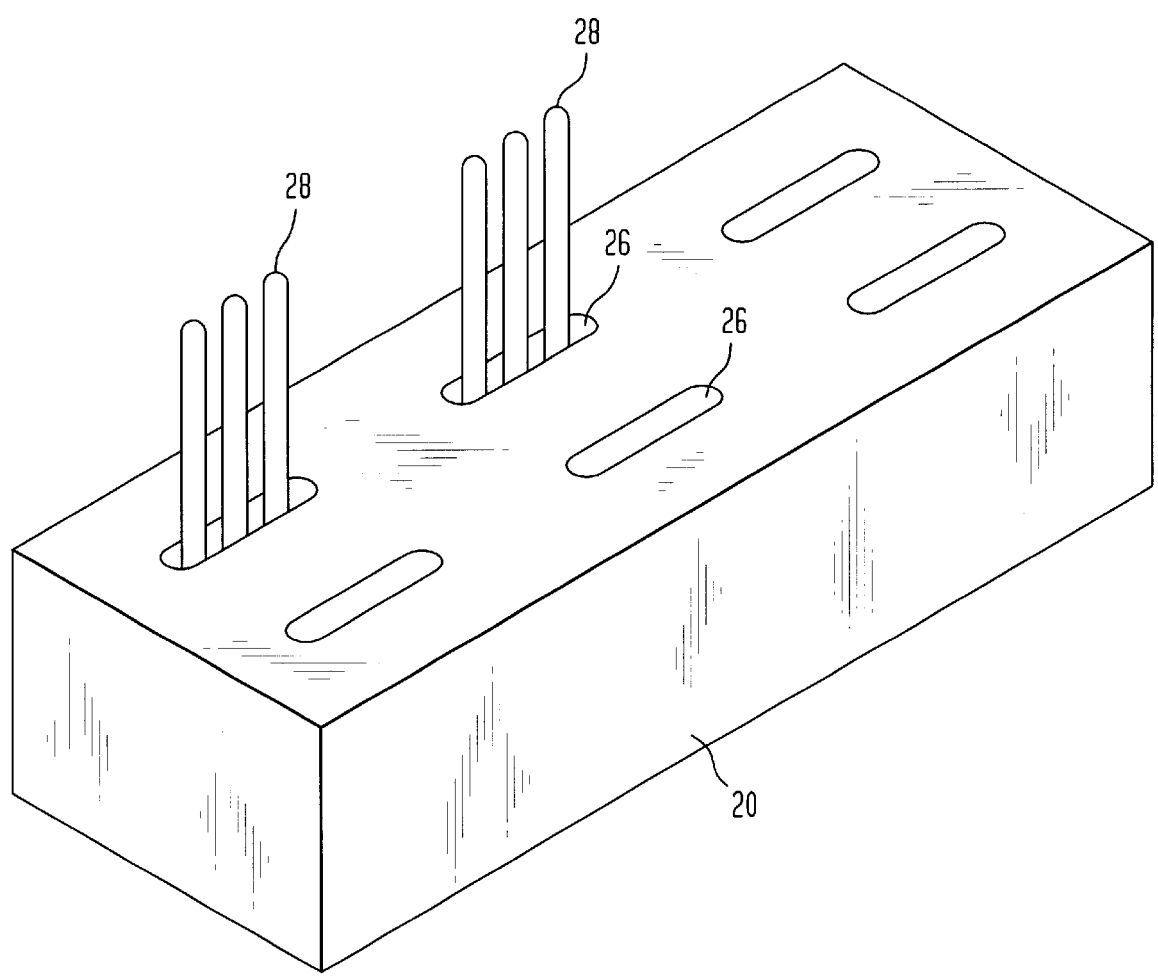
FIG. 3 is a schematic illustration of a structure comprising catalytic phase particles having a ribbon-shaped morphology wherein a plurality of nanowires are grown from each recessed pore of the structure.

In another embodiment, the phase-separated substrate of FIG. 2A is uniaxially and plastically deformed, e.g., by extrusion, swaging, rod drawing, wire drawing process, or the like, to elongate the alloy substrate of FIG. 2A and produce the elongated substrate 20a of FIG. 2B, with elongated phase rods 22a. The diameter of the catalytic phase will be reduced as elongated. For example, initially in FIG. 2A the catalytic-phase rods 22 may be 5-cm in diameter and comprised of 20 nm diameter spherical particles. These rods may be extruded or wire-drawn into 0.25 cm diameter elongated rods 22a of FIG. 2B. The initially 20-nm diameter spherical particles may thereby be elongated into 1 nm diameter fibers that are about 8000 nm long, with a large length-to-diameter aspect ratio of 8000. This capability to reduce and select the catalyst diameter advantageously enables one to pre-design the diameter of the nanotubes to be grown, e.g., by closely matching the diameter of the SWNT (~1.3 nm), or that of a particular MWNT with a specific diameter and specific number of concentric walls. The desired amount of deformation to be given to the alloy may be selected based on the final nanowire diameter desired. Typically there will be a reduction in the cross-sectional area of the catalytic rods 22 in the range of 50–99.99%. In the deformation of the two-phased structure, the spherical phase would theoretically elongate into a needle with some varying diameters. However, the mechanical hardnesses of the decomposed two phases are often different, and the plastic deformation may not always be uniform. Consequently, the diameter variation along the needle can be much less than in the theoretical case, especially if the catalytic phase is softer than the surrounding non- (or less-) catalytic phase. The deformed alloy rods or wires (e.g., of FIG. 2B), can optionally be bundled together, placed in a jacket, and subjected to additional deformation to further reduce the diameter of the catalytic phase particles. Also, instead of or in combination with the uniaxial deformation, a planar-type deformation such as by cold rolling, hot rolling, or compression deformation, may be used. In this case, the catalytic phase particles will have a ribbon-shaped morphology rather than a fiber-shaped morphology, and a multiplicity of, rather than a single, nanowire will be grown from the cross-section of the ribbon-shaped catalyst, e.g., as schematically illustrated below in FIG. 3. In FIG. 3, the exposed but recessed catalytic phase has a width corresponding to the diameter of a nanowire but a length somewhat longer than the nanowire diameter. Thus, a multiplicity of aligned nanowires 28 are grown from each of the recessed pores 26 of the two-phased alloy substrate 20a.

Referring to FIG. 2C, the elongated substrate 20a containing elongated and aligned catalytic phase materials may be sectioned to a desired thickness, e.g., along the dashed lines "S" shown in FIG. 2C, to produce sectioned alloy pieces 27. The alloy pieces 27 have a plurality of substantially equal-sized elongated and aligned catalytic phases 22b. The resultant sectioned pieces may be polished smooth, by mechanical or other means. Because of the large aspect ratio of the catalytic phase in the fiber configuration, a cross-section from any location along the length of the substrate 20a (FIG. 2C), tends to give essentially identical and reproducible microstructures, especially in the case of periodic spinodal structures, with essentially the same number of exposed catalyst particles on each of the various sectioned surfaces. Such a structure promotes the uniformity of nanowire diameter and density in the CVD synthesis of nanowires. The reduced-diameter nanocatalyst structure of FIG. 2C may be used for nanowire nucleation, and the size uniformity and geometrical symmetry of the catalyst-phase regions or "islands" may produce symmetrical nanowire growth, i.e., self-aligned growth. Additionally, alignment processing may be implemented in various ways. For example, a nanowire-crowding mechanism may be used or an electrical field applied during the CVD process to achieve aligned nanowires with reduced diameter. An optional, additional process of introducing a recessed pore or embedded alignment mechanism into the nanocatalyst structure also may be used.

Figure 2D:
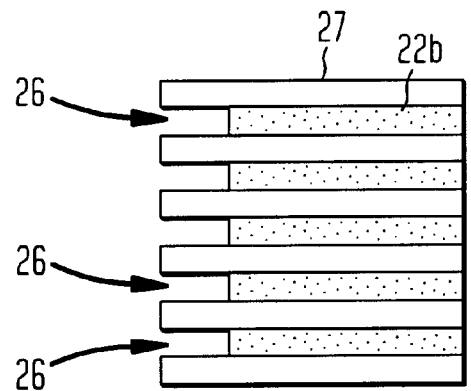
Figure 2E:
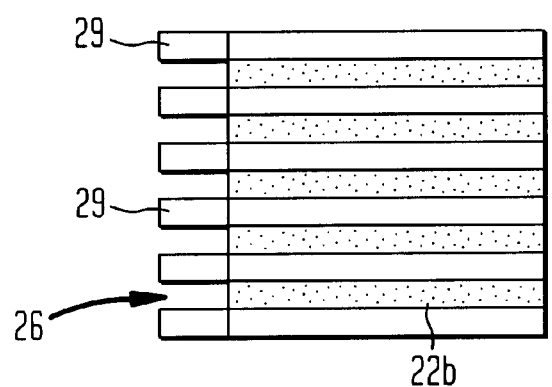
Figure 2F:
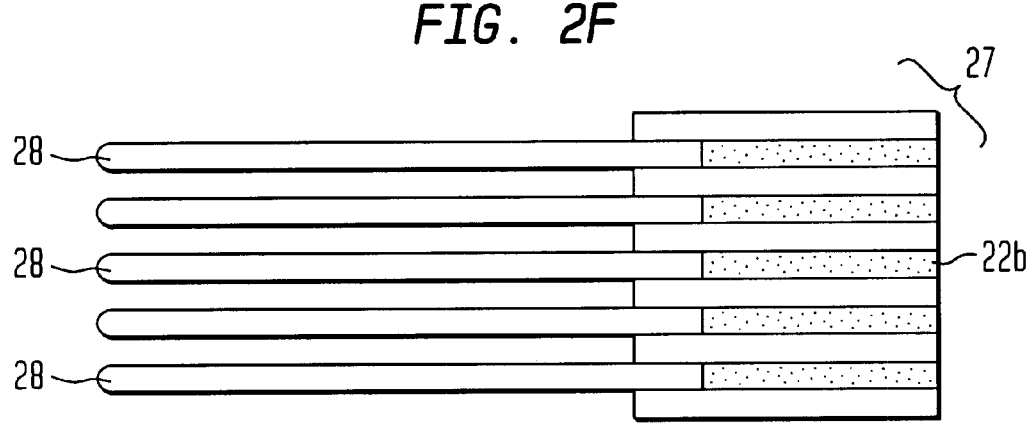

FIGS. 2D–2F illustrate the recessed-pore alignment processing. Referring to FIG. 2D, the polished surface of the sectioned alloy piece 27 of FIG. 2C is subjected to differential etching. The alloy piece 27 may be etched along a surface revealing a cross-section of catalytic particles, e.g., by using chemical etching, electrochemical etching, or other etching processes such as plasma etch, ion beam etch, laser etch, and so forth. The two phases in the phase-separated structure will have different compositions and hence different etching rates. For example, consider the example where an Fe—Cr alloy system is used to produce an alloy substrate 20 (FIG. 2A) and sectioned alloy piece 27 (FIG. 2C) having a catalytic Fe-rich phase 22a surrounded by a Cr-rich matrix (less catalytic) phase 24. The Fe-rich phase regions of the structure will be dissolved much faster by acid than the Cr-rich matrix phase surrounding the Fe-rich phase fibers. Hence, where the catalytic phase 22b comprises Fe-rich materials and the non- or less-catalytic region 24 comprises Cr-rich materials, an acid etch will produce aligned and recessed pores 26, as illustrated in FIG. 2D. However, if a Cu—Fe alloy system is used, the Fe-rich catalytic phase will dissolve slower in certain acids than the Cu-rich matrix phase. Accordingly, to produce the desired recessed structure, an additive step is performed as opposed to an etching step. Cu atoms are added to the polished surface of the deformed Fe—Cu alloy, e.g., by electroplating or electroless plating. As illustrated in FIG. 2E, the Cu atoms tend to preferentially become attached onto the Cu-rich phase, thus forming protrusions 29 of Cu atoms and creating the desired recessed-pore structure. The pores advantageously have circular or elongated cross-sectional shapes although other shapes may be used as well.

Whether a substractive (FIG. 2D) or additive (FIG. 2E) step is used to achieve the pore structure will depend on the particular alloy systems, the chemical properties of the separated phases, and the differential etching chemicals or mechanisms employed. Once the pore structure is created, aligned nanowires 28 may be nucleated and grown outward from the cavities 26 in the substrate 27, as shown in FIG. 2F. The result is an alloy structure having a two-phased alloy substrate with a catalytic 22b and non-catalytic phase 24 and aligned nanowires 28 extending from, and attached to, the substrate. Applying this method of fabrication, the nanowires may be aligned with a tilt of less than 25 degrees, and preferably less than 15 degrees from the axis of the catalyst phase alignment. The final diameter of the aligned nanowires on the alloy substrate may be less than 50 nm, and preferably is less than 10 nm, and even more preferably less than 6 nm.

As an example, a nano-scale elongated and aligned two-phased structure may be obtained using a Fe-33Cr-7Co-2Cu alloy by the following process. The alloy is provided, heated, and solution annealed at about 660° C. (equivalent to $T_1$ in FIG. 1B). After the solution annealing, the alloy is given a spinodal decomposition heat treatment by cooling to ~595° C. at a rate of 7° C./hr, and it is water quenched. From this processing, a substrate is obtained comprising a near-spherical (Fe,Co)-rich phase of alloy rods having particles ~40 nm in diameter that are surrounded by a Cr-rich matrix (e.g., FIG. 2A). Next, a uniaxial deformation is performed by wire drawing the substrate including the (Fe,Co)-rich phase or alloy rods. The alloy rods are reduced about 99% in cross-sectional area, or by a factor of 10. The (Fe,Co)-rich particles are elongated with an aspect ratio of ~1000, and their diameter is reduced from ~40 nm to 4 nm. Alternatively, instead of uniaxial plastic deformation, a magnetic field heat treatment (or a combination of plastic deformation and magnetic field heat treatment) may be applied to the spinodally-decomposing structure and obtain a parallel-fiber configuration of reduced-diameter catalytic phase, e.g., in the Fe—Cr—Co alloy system. The deformed alloy may be given an additional low temperature heat treatment to further build up the compositional amplitude. Processing details for the Fe—Cr—Co spinodally decomposing alloys are given in publications by Jin et al., IEEE Trans. Magnetics, Vol. MAG-16, p. 1050 (1980), and IEEE Trans. Magnetics, Vol. MAG-23, p. 3187 (1987), incorporated herein.

The elongated alloy substrate thus produced, e.g., having the parallel-fiber configuration, may be bundled together and again uniaxially deformed to further reduce the diameter of the catalytic phase. The resultant structure can be sectioned to provide pieces with reproducible cross-sections, as in FIG. 2C. The surfaces of the pieces may be polished smooth and then etched to produce the recessed pore configuration of FIG. 2D, due to the different etch rate for the catalytic and non-catalytic phases (more etching in the (Fe,Co)-rich fiber phase than in the Cr-rich matrix phase). Scanning electron micrographs taken from the sectioned, polished, and etched surface of the deformed Fe—Cr—Co wire sample shows that a uniform-sized recessed pore structure may be produced wherein each pore has a diameter of about 4 nm.

Figure 4A:
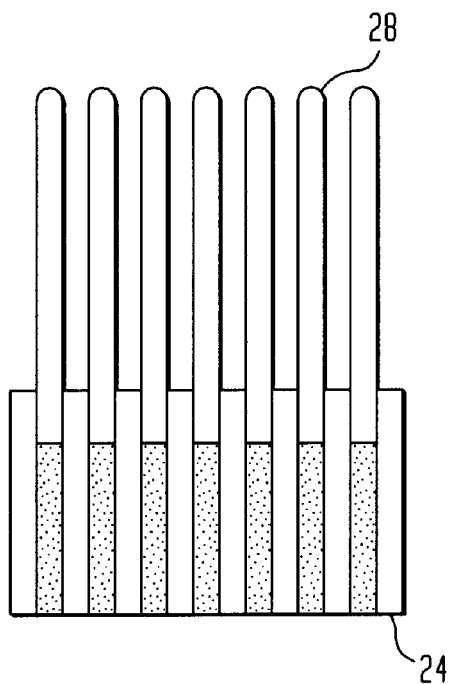
Figure 4B:
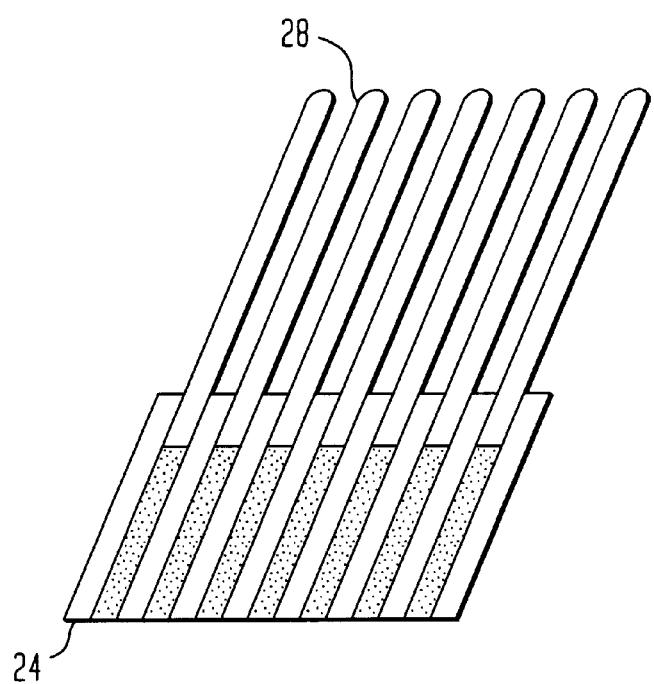

Chemical vapor deposition (or other synthesis methods) then may be performed to grow aligned nanowires from the recessed pore structure. The temperature of CVD processing for the nanowire synthesis and the type of hydrocarbon source gas to be used should be selected so that the nano-catalyst, multi-phase structure remains stable at the CVD temperature. To illustrate, in this example where the catalytic substrate comprises Fe—Cr—Co alloys, care should be taken that the CVD temperature does not exceed the spinodal temperature, ~630° C. Other alloys having a higher temperature range of miscibility gap would allow for higher temperature CVD processing. The aligned nanowires with a reduced diameter can be grown perpendicular to the sectioned alloy surface (parallel to the axis of elongation of the spinodal substrate), as shown in FIG. 4A. Alternatively, the nanowires can be grown along any desired direction, such as an angled direction shown in FIG. 4B. The angled growth can be achieved by sectioning the deformed alloy piece (e.g., 27 in FIG. 2C) at different inclined angles.

The invention can be used for synthesis of other types of aligned and reduced-diameter nanowires, such as semiconductor nanowires of Si or Ge, or other types of metal or ceramic nanowires. For example, to synthesize Si nanowires by CVD, a two-phased structure may be used containing nano-scale fibers of Si-nucleating metals, e.g., those rich in Fe or Au, surrounded by a non-catalytic phase material. A recessed pore structure may be formed, with the Si-nucleating metals disposed within the recessed regions or cavities. Si nanowires then may be nucleated from the bottom of the cavities and grown out as aligned Si nanowires. The invention may be used to fabricate ceramic nanowires, e.g., comprised of boride, carbide, nitride, carbonitride, or boron-nitride. If electrically insulating, the nanowires may be coated with electrically conducting films to allow for electron transport to the emitting tips. The invention can also be used to create small-diameter nanowires having a hetero-junction structure (e.g., a metallic nanowire having an end attached onto a semiconducting Si nanowire) and an array of heterojunction structures. Sequential CVD processing may be applied to achieve such heterojunction structures and arrays. Previous approaches for fabricating hetero-junction structures do not show how to make an array of hetero-junction structures or how to make small-diameter and uniform heterojunction structures.

The small-diameter nanowires are useful for a variety of applications. For example, they may be used in fabricating microwave power amplifiers, illustrated in FIGS. 5A and 5B, flat panel field emission displays, illustrated in FIG. 6, high-capacity electrodes for rechargeable Li batteries, and high-capacity, light-weight hydrogen storage devices. In field emission devices, the reduced diameter of the nanowires is advantageous in concentrating the applied electric field. In the case of battery electrodes or hydrogen storage materials, the increased surface area of the nanowires is advantageous. An increased surface area is generated not only from the reduced diameter of the nanowires but also from the fact that the nanowires are separated (unbundled), with their roots attached to the nanoscale-separated catalytic phase of the substrate. The spacing between the nanotubes can provide extra adsorption sites for hydrogen atoms or additional intercalation of alkaline metals such as Li or K. Hydrogen storage capacity of the carbon nanotubes also may be enhanced by alkali-doping, see P. Chen et al, *Science,* Vol. 285, p. 91 (1999).

Figure 5A:
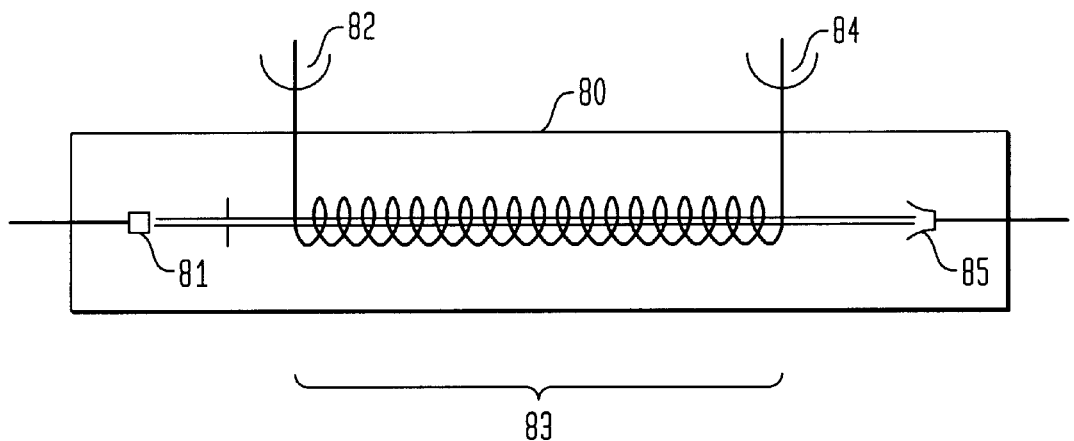

Referring to the drawings, FIG. 5A is a schematic cross-section of an exemplary microwave vacuum tube device—here a Traveling Wave Tube (TWT)—comprising the small-diameter nanowires. The device includes an evacuated tube 80, a source of electrons in the form of an electron gun 81 including use of small-diameter nanowires, an input window 82 for introducing a microwave input signal, an interaction region 83 where the electrons interact with the input signal, and a microwave output window 84 where microwave power derived from the electrons is taken out of the tube. In the case of a TWT, other components may include a focusing magnet (not shown) to focus the beam of electrons through the interaction region 83, a collector 85 to collect the electron beam after the output microwave power has been generated, and an internal attenuator (not shown) to absorb microwave power reflected back into the tube from mismatches in the output. For a TWT, the interaction region 83 can be a conductive helix for broadband applications or a coupled-cavity region for high power applications.

Figure 5B:
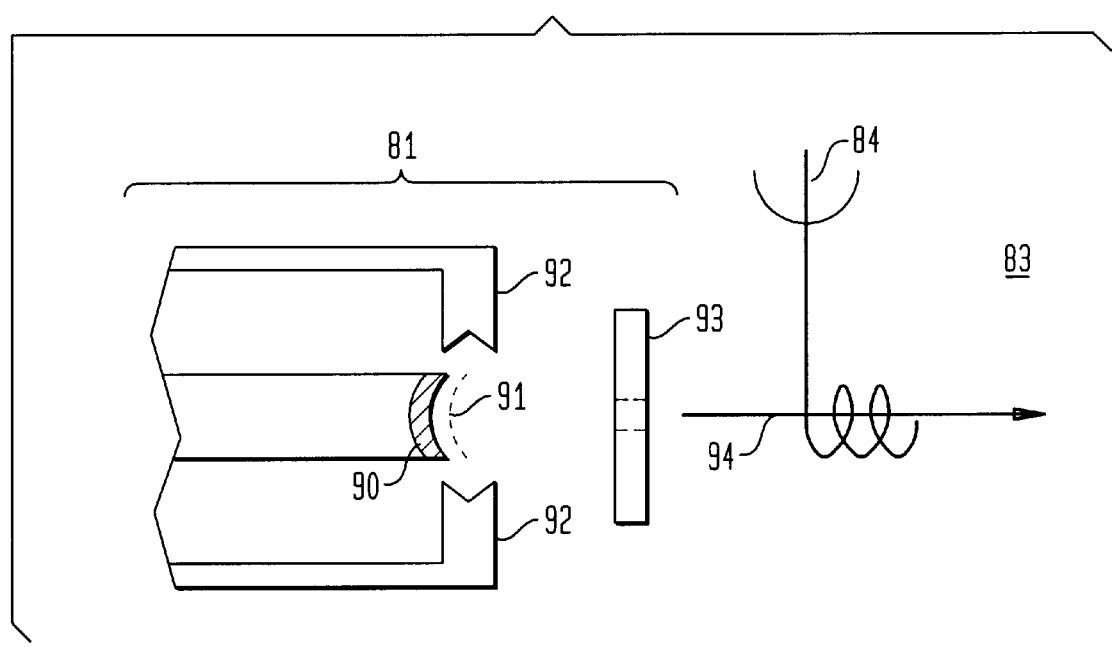

The electron gun 81 is an electron source that generates, accelerates, and focuses an electron beam to follow a desired trajectory after it leaves the gun. FIG. 5B schematically illustrates a cut-away view of an exemplary electron gun 81 comprising the inventive nanowires. The gun includes cathode 90 comprising small-diameter nanowires for emitting electrons, one or more grids 91 for inducing emission of electrons, focusing electrodes 92 for focusing the electrons into a beam, and apertured anode 93 for further directing the beam 94 into interaction region 83. For TWT applications, a long, thin electron beam 94 at relatively low voltage and high current density is desirable. Electron guns can range in configuration from a planar cathode faced by a planar anode to more elaborate designs such as Pierce guns, conical diode electrodes, concentric cylinders, or spherical cap cathodes.

In operation, an electron beam 94 is accelerated from cathode 90 by high voltages applied to one or more grids 91 and anode 93. The electron beam is then shot into the interaction region 83 where it interacts with the microwave input signal to be amplified as the electrons and the signal travel together through the interaction region of the amplifier. Higher (more positive) voltage may be applied to accelerate and impart a relatively high energy to the emitted electrons. In a TWT, the electrons desirably travel at the same velocity as the microwave signal on the interaction region. The power of the input signal modulates the electron beam, and the modulated electron beam generates an amplified form of the input signal at output 84. Thus, in the TWT of FIGS. 5A–5B, the cathode 90 comprising nanowires and grid 91 are the source of electrons. Conventionally, thermionic cathodes have been used for providing the source of electrons.

In achieving optimal device performance, the cathode advantageously should (i) emit electrons freely at convenient low electric fields, (ii) be capable of supplying a high current density, (iii) have a long operating life with its electron emission continuing substantially unimpaired, (iv) allow for the production of a narrow beam with a small spread in electron momentum, and (v) allow for the production of a modulated electron beam at or near the cathode. Applicants have discovered that cold (unheated) cathodes comprising a plurality of aligned and small-diameter nanowires are advantageous in reaching these parameters and preferably to the thermionic cathodes conventionally used. Cold cathodes fabricated with the nanowires are capable of fast, room-temperature emission of electrons when an electric field is applied. They allow for the production of a modulated electron beam over a distance of a few microns, permitting the use of a shortened interaction region and resulting in a lighter, more compact device.

Efficient electron emission at low applied voltages is typically achieved by using multiple accelerating gate-electrodes placed in close proximity (typically about 1–10 micron distance) to the cathode or nanowire emitters. To maximize the capability of multiple emitters, a gate electrode having multiple gate apertures for a given emitter body may be used, e.g., using a fine-scale, micron-sized gate structure which maximizes the number of gate apertures. Accordingly, with this invention, a fine-scale grid 91 optionally is placed in front of the nanowire cathode for field emission devices, between the electron-emitting cathode and the anode. The grid 91 should be separated from the cathode but be sufficiently close to it to excite emissions. Typically, a distance of about 10 $\mu$m or less between the grid 91 and emitting nanowire tips 90 will be sufficient. Such a close cathode-grid separation may be achieved when the emitter nanowires are aligned without bending and their tips have a relatively uniform height.

Advantageously, the grid 91 is conductive and comprises a layer of thin film or thin foil conductor material. The conductive material used for fabricating the grid may be selected from Cu, Cr, Ni, Nb, Mo, W, or alloys thereof Other conductive materials, such as highly-conductive oxides including nitrides and carbides, also may be used. Preferably, the grid has a thickness in the range of 0.05 to 100 micrometers and more preferably in the range of about 0.1 to 10 micrometers. A multitude of apertures advantageously are disposed in the grid and each aperture is aligned with a multiplicity of nanowire emitters. Thus, when a field is applied between the cathode and the grid, a multiplicity of nanowires will emit electrons within each aperture area. The particular shape of the aperture areas is not particularly important, e.g., the apertures may have circular, square, rectangular, or irregular shapes. Each aperture area preferably has a diameter or width designed to increase the density of grid apertures, maximize the number of nanowire emitters within the aperture areas, and reduce the angular beam spread. Aperture areas in the range of about 0.05 to 11 micrometers, more preferably in the range of 0.5 to 10 micrometers, are advantageous for these purposes. The thickness of the grid advantageously is in the range of about 0.05 to 100 micrometers, and more preferably in the range of about 0.1 to 10 micrometers. To prepare the grid, thin film deposition and photolithographic etching techniques may be used and are known in the field.

Additionally, an electrically-insulating layer (not shown) optionally may be disposed between the cathode 90 and grid 91. This layer may be fabricated with aluminum oxide or other electrically-insulating materials known in the field. Advantageously it has a thickness in the range of 1–10 micrometers.

Figure 6:
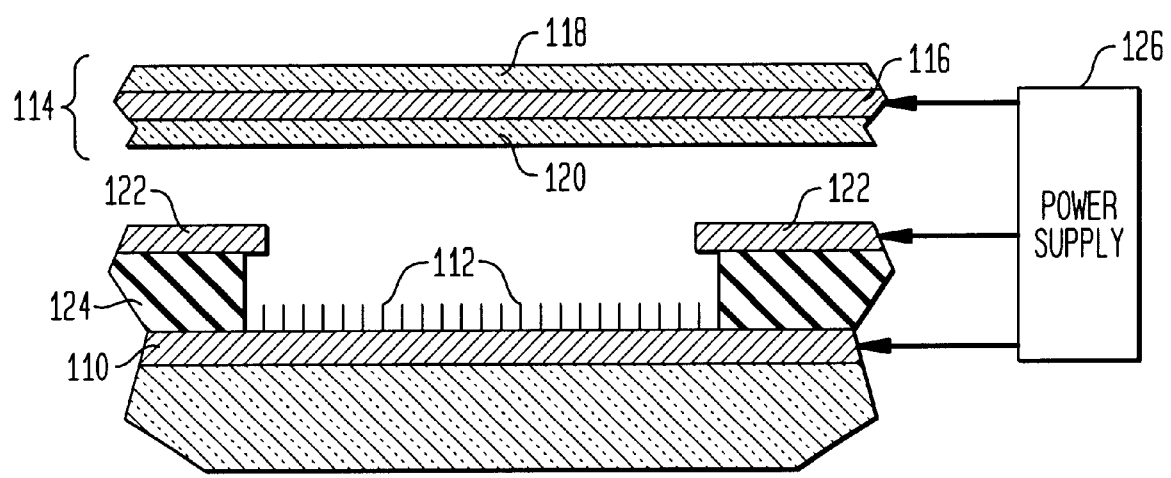
FIG. 6 schematically illustrates a field emission display device comprising aligned small diameter nanowires.

The nanowire emitters described herein may be used to make flat panel, field emission displays. FIG. 6 schematically illustrates a cut-away view of a field emission flat panel display device. The display comprises an alloy substrate 110 which also serves as a cathode, a plurality of nanowire emitters 112 attached to the alloy substrate, and an anode 116 disposed in spaced-apart relation from the emitters 112, within a vacuum seal. The substrate 110 is comprised of at least two phases including a catalytic phase and a non (or weakly) catalytic phase. The anode 116 (typically a transparent conductor such as indiumtin-oxide) is disposed between an insulating layer 118 and a phosphor or display layer 120, and is mounted on support structures such as pillars (not shown). In this embodiment, between the cathode 110 and anode 116 and closely spaced from the emitters 112 there is disposed an apertured conductive gate layer or gate electrode 122. A thin insulating layer 124 may be disposed between the cathode 110 and gate electrode 122. The displays can be constructed with a diode (i.e., anode-cathode) or triode (i.e., cathode-grid-anode), configuration. The triode configuration is preferred for producing more efficient field emissions. Advantageously, a high-density apertured gate structure is placed in close proximity to the cathode and nanowire emitters. The gate structure may be fabricated by lithographic patterning.

In operation, the space between the anode 116 and emitters 112 is sealed and evacuated, and voltage is applied by power supply 126. Field-emitted electrons from nanowire emitters 112 are accelerated by gate electrode 122, move toward anode 116, and hit the phosphor layer 120, to generate a display image. When the small diameter nanowires are used for the emitters, a stronger local electric field concentration is generated as compared with previous display devices.

For display applications, each pixel of the display advantageously comprises a multitude of nanowire emitters. Because of the small diameter of the nanowires, a single emitter or "cold cathode" may contain many emitting points. For example, assuming 500% nanowire density with a tubule diameter of 1–100 nm, a pixel dimensioned at 100× 100 micrometers may contain more than $10^4$ emitting tips. Advantageously, the emitter density is at least $1/(micrometer)^2$, more preferably at least $10/(micrometer)^2$. Since efficient electron emission is achieved at low voltage by disposing an apertured gate electrode in close proximity to the cathode, advantageously such a gate electrode is used, having multiple gate apertures over a given emitter area. A fine-scale, micron-sized structure with as many gate apertures as possible advantageously is used.

It is understood that the embodiments described herein are merely exemplary and that a person skilled in the art may make many variations and modifications without departing from the spirit and scope of the invention. For example, although microwave amplifier and field emission display applications are discussed, many other applications are contemplated such as lithium rechargeable batteries. All such variations and modifications are intended to be included within the scope of the appended claims.

The invention claimed is:

1. An article including a nanowire structure comprising (i) an alloy substrate comprised of at least a first phase and a second phase, wherein the first phase is catalytic to provide reactivity for the growth of nanowires and the second phase is less catalytic than the first phase, and (ii) a plurality of small diameter nanowires attached to the first phase of the alloy substrate.

2. The article of claim 1 in which each one of the plurality of nanowires is substantially vertically aligned relative to the substrate in which the average deviation from full vertical alignment is less than 25 degrees.

3. The article of claim 2 in which the average deviation from full vertical alignment is less than 15 degrees.

4. The article of claim 1 in which the alloy substrate is fabricated with an alloy system that is spinodally decomposed to achieve a phase-separated substrate comprising the first and second phases wherein the first phase comprises a plurality of catalytic regions periodically distributed within the second phase.

5. The article of claim 4 in which the alloy system comprises an alloy selected from the group consisting of Fe—Cr—Co, Cu—Ni—Fe, Cu—Ni—Co, Fe—Ni—Al, and Fe—Al—Ni—Co.

6. The article of claim 1 in which the alloy substrate is fabricated with an alloy system that is subjected to nucleation-and-growth transformation to achieve a phase-separated substrate comprising the first and second phases wherein the first phase comprises a plurality of catalytic regions periodically distributed within the second phase.

7. The article of claim 4 in which the alloy system comprises an alloy selected from the group consisting of Cu—Fe, Cu—Co and Cr—Fe.

8. The article of claim 1 in which the average diameter of the nanowires is less than 50 nm.

9. The article of claim 1 in which the average diameter of the nanowires is less than 10 nm.

10. The article of claim 1 in which the alloy substrate comprises a plurality of regions of the first phase, wherein each one of the plurality of regions of the first phase is surrounded by and isolated by the second phase.

11. The article of claim 10 in which the average diameter of the plurality of regions of the first phase is less than 50 nm.

12. The article of claim 11 in which the average diameter of the plurality of regions of the first phase is less than 10 nm.

13. The article of claim 1 in which the plurality of nanowires are selected from carbon nanotubes, semiconductor wires comprising silicon or germanium, ceramic wires comprising at least one of boride, carbide, and nitride, metallic nanowires, and nanowires having a heterojunction.

14. The article of claim 1 in which a surface of the alloy substrate has at least one recessed pore defining a cavity and the first phase is disposed within the cavity of the at least one recessed pore.

15. A lithium rechargeable battery having an electrolyte and electrodes wherein at least one of the electrodes comprises the nanowire structure of claim 1.

16. The article of claim 1 wherein the substrate comprises a plurality of oriented rods of the first phase substantially surrounded by the second phase.

17. The article of claim 16 wherein the substrate has a surface and the rods are substantially perpendicular to the surface.

* * * * *